(12) United States Patent
Kolb et al.

(10) Patent No.: US 6,451,918 B1
(45) Date of Patent: Sep. 17, 2002

(54) SULFONYL LINKER FOR THE CREATION OF LIBRARIES VIA IMMOBILIZATION OF AMINES

(75) Inventors: Hartmuth C. Kolb, East Windsor, NJ (US); Gerard McGeehan, Chester Springs, PA (US)

(73) Assignee: Coelacanth Corporation, East Windsor, NJ (US)

( * ) Notice: Subject to any disclaimer, the term of this patent is extended or adjusted under 35 U.S.C. 154(b) by 0 days.

(21) Appl. No.: 09/533,287

(22) Filed: Mar. 22, 2000

Related U.S. Application Data

(60) Provisional application No. 60/125,569, filed on Mar. 23, 1999.

(51) Int. Cl.⁷ .............................................. C08F 273/00
(52) U.S. Cl. ...................................... 525/259; 525/261
(58) Field of Search ................................... 525/259, 261

(56) References Cited

PUBLICATIONS

1995, Fukuyama, T., et al., Tetrahedron Lett. 36:6373.
1997, Kay, C., et al., Tetrahedron Lett. 38:6941–44.
1986, RajanBabu, T.V., et al., J. Org. Chem. 51:1704–1712.
1997, Siegel, M.G., et al., Tetrahedron Lett. 38:3357–3360.

*Primary Examiner*—Bennett Celsa
(74) *Attorney, Agent, or Firm*—McDonnell Boehnen Hulbert & Berghoff

(57) ABSTRACT

Disclosed are novel compounds of which function as a sulfonyl linker between a target molecule and a polymer solid support, novel sulfonyl aziridine scaffold intermediates to optimize the regioselectivity associated with the nucleophilic substitution of these aziridines, a method for making derivatized aziridine, and a method for making derivatized amines.

1 Claim, No Drawings

SULFONYL LINKER FOR THE CREATION OF LIBRARIES VIA IMMOBILIZATION OF AMINES

This application claims the benefit of U.S. Provisional Application No. 60/125,569, filed Mar. 23, 1999.

BACKGROUND OF THE INVENTION

1. Field of the Invention

This invention relates to combinatorial library creation requiring the immobilization of amines by employing a novel sulfonyl linker.

2. Description of the Related Art

The creation of combinatorial libraries has become a rapid developing technology and an efficient tool in drug discovery. It allows for the biological screening of many compounds in a relatively short period of time, a goal not attainable by traditional medicinal organic synthetic pathways.

Combinatorial library creation often requires an amine to be attached to a solid phase support. This is usually done by using a linker that covalently binds the amine either as a caroboxamide or as a carbamate. The linkers themselves are insoluble in the reaction solvents and inert to the reagents employed in the synthetic sequence. The linker bond is eventually cleaved and the products are eluted or filtered from the solid support. However, the relatively high reactivity of carboxamides and carbamates limits the chemical scope of library synthesis. Quite often, amides are not orthogonal to the other functional groups present in the synthetic scheme. Also, immobilization of highly functionalized aziridine scaffolds through amide linkers usually yield very poor regioselectivities in nucleophilic opening reactions, giving rise to mixtures of compounds that are difficult to separate. Further, cleavage conditions are quite often harsh (i.e. acidic or basic reaction conditions) and incompatible with functional groups present in the products, thereby limiting the scope of library synthesis.

Recently, polymer bound sulfonamide linkers have been employed because of their chemical stability. Kay, C., Murray, P. J., Sandow, L., Holmes, A., *Tetrahedron Lett.* 1997, 38, 6941–44. The use of this group as a linker for solid phase chemistry allows a wide range of chemistries to be performed. In contrast to common arene sulfonamides, the S—N bond can be readily cleaved under homogenous conditions using PhS$^-$. Fukuyama, T., Jow, C., Cheung, M. *Tetrahedron Lett.* 1995, 36, 6373. One problem with this method, however, is its lack of versatility, since the sulfonamide is formed before the linker is attached to the solid support. A better approach would be to first attach the linker to the support and then react the sulfonyl chloride with an amine. Further, the aromatic core is highly activated due to the presence of three electron withdrawing groups. This arrangement can lead to undesirable side reactions, such as single electron transfer reactions and aziridine decomposition. Thus, aziridines cannot be immobilized in high yield with this linker due to the very high reactivity of the sulfonyl group.

It is therefore desirable to employ a linker that allows cleavage of the amine from the solid support under mild reaction conditions while still providing the greatest degree of synthetic versatility. Aziridine scaffolds that are immobilized with a carbamate or carboxamide linker usually give poor regioselectivity in nucleophilic opening reactions. It is known that N-sulfonylaziridines give much better regioselectivities, preventing the formation of undesired compound mixtures.

SUMMARY OF THE INVENTION

This invention provides novel compounds of the Formula I which function as a sulfonyl linker between a target molecule and a polymer solid support. Accordingly, a broad embodiment of the invention is directed to compounds of general Formula I:

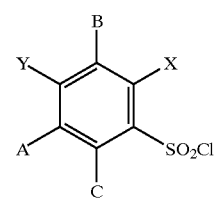

wherein

X and Y are different and represent hydrogen or $NO_2$; and

A, B and C are different and represent hydrogen or D where

D is

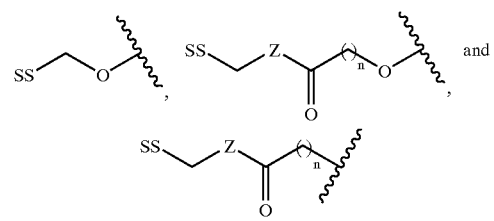

wherein

SS is a solid support;

Z is O, NH or NR where R is lower alkyl; and n is 0, 1, 2 or 3.

The invention further encompasses the use of immobilized sulfonyl aziridine scaffold intermediates to optimize the regioselectivity associated with the nucleophilic substitution of these aziridines. The invention also provides a method for making derivatized aziridine. Also, the invention provides for a method for making derivatized amines. For example, known compounds such as the vasodilator Isoxsoprine® (A) can be synthesized with the method of the present invention.

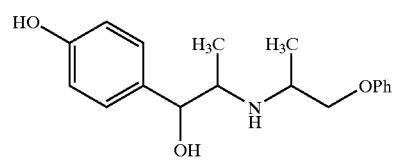

DETAILED DESCRIPTION OF THE INVENTION

The novel compounds encompassed by the instant invention can be described by the general Formula I set forth above. As seen in Formula I, the linker synthesis is designed to provide immobilized sulfonyl chlorides. This provides the greatest degree of versatility for sulfonamide based solid phase chemistry.

In addition, the present invention encompasses compounds of the Formula II:

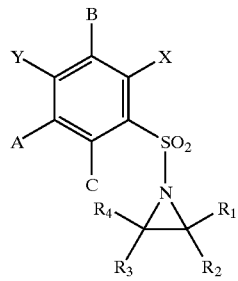

II wherein
- $R_1$, $R_2$, $R_3$ and $R_4$ are the same or different and represent hydrogen, lower alkyl, aryl or arylalkyl, where each alkyl portion is optionally mono-, di-, or trisubstituted with halogen, lower alkoxy, lower alkyl, $C_2$–$C_6$ alkenyl, $C_2$–$C_6$ alkynyl, or $CO_2R_5$, and each aryl portion is optionally substituted with up to three groups selected from halogen, lower alkyl, lower alkoxy, $C_2$–$C_6$ alkenyl, $C_2$–$C_6$ alkynyl, or $CO_2R_5$, wherein $R_5$ is hydrogen or lower alkyl;
- X and Y are different and represent hydrogen or $NO_2$; and
- A, B and C are different and represent hydrogen or D where
- D is

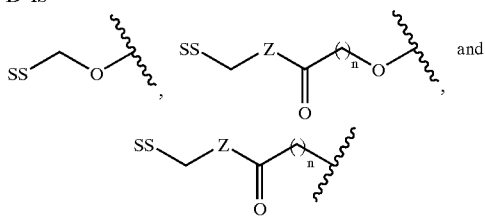

wherein
SS represents a solid support;
Z is O, NH or NR where R is lower alkyl; and
n is 0, 1, 2 or 3.

The compounds of Formula II represent the chemically labile aziridine intermediates that are synthesized from the respective sulfonyl chloride of Formula I. Thus, the invention also encompasses a method for making a compound of Formula II by reacting a compound of general Formula I with an aziridine of Formula III:

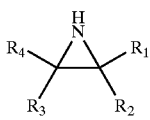

III

The reactivity of the $SO_2Cl$ and ultimately the $SO_2$-aziridine group is manipulated by placing electron withdrawing functional groups out of conjugation with the phenyl backbone. Specifically, it is preferable to place an $NO_2$ group in the para position to the $SO_2$ group. The discovery that para-nitrobenzenesulfonyl aziridines are considerably more stable than ortho-nitro-benzenesulfonyl aziridines is unexpected and it enables these useful intermediates to be made in good yields. It is also preferable to attach certain electron donating groups, e.g. π-donors (R—O, AcO, AcNH) or σ-donors (alkyl), to the phenyl backbone. These optimizations prevent set side reactions as well as aziridine decomposition and they allow the immobilization of the chemically labile aziridines.

Cleavage of the amine from the solid support can be accomplished under homogeneous conditions by treatment with soft nucleophiles, e.g. PhSK or PhSH/DBU, under conditions described by Fukuyama et al. (T. Fukuyama, C.-K. Jow, M. Cheung *Tetrahedron Lett.* 1995, 36, 6373). Therefore, the present invention also encompasses a method for making derivatized amines by reacting a compound of Formula II with a nucleophile to provide a compound of Formula IV:

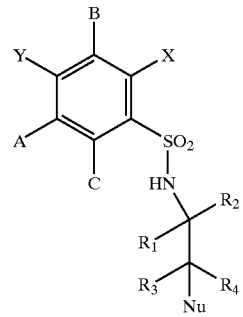

IV

The amine is subsequently cleaved from the solid support to provide a compound of Formula V:

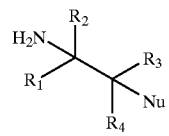

V

Separation of the product amine from cleavage reagents and purification is performed by passing the cleavage solution through a cation exchange resin (M. G. Siegel et al. *Tetrahedron Lett.* 1997, 38, 3357–3360). The latter adsorbs the amine while it allows all reagents and non-basic side and by-products to pass through. Desorption of the products is achieved by treatment of the resin with aqueous ammonia.

By nucleophile (Nu) in the present invention is meant ROH, RSH, $R_5NH_2$, $R_5R_6NH$, ROM, RSM, $N_3^-$, $CN^-$, R—C≡C$^-$, $R_7$—C(O)—CH2—C(O)—$R_8$, and $R_7$—C(O)—CH$_2$—CO$_2R_8$, where $R_5$, $R_6$, $R_7$, and $R_8$ are lower alkyl or aryl and M is a metal such as, for example, $Na^+$, $Li^+$ or $K^+$.

By "alkyl", "lower alkyl", and "$C_1$–$C_6$ alkyl" in the present invention is meant straight or branched chain alkyl groups having 1–6 carbon atoms, such as, methyl, ethyl, propyl, isopropyl, n-butyl, sec-butyl, tert-butyl, pentyl, 2-pentyl, isopentyl, neopentyl, hexyl, 2-hexyl, 3-hexyl, and 3-methylpentyl.

By "alkenyl" and "$C_2$–$C_6$ alkenyl" in the present invention is meant straight or branched chain alkyl groups having 1–6 carbon atoms and containing at least one double bond, such as, 1-propenyl, 2-propenyl, 1-butenyl, 2-butenyl, and 2-methyl-1-propenyl.

By "alkynyl" or "$C_2$–$C_6$ alkynyl" in the present invention is meant straight or branched chain alkyl groups having 1–6 carbon atoms and containing at least one terminal triple bond, such as, 1-propynyl, 1-butynyl, and 1-pentynyl.

By "alkoxy", "lower alkoxy", and "$C_1$–$C_6$ alkoxy" in the present invention is meant straight or branched chain alkoxy groups having 1–6 carbon atoms, such as, for example, methoxy, ethoxy, propoxy, isopropoxy, n-butoxy, sec-butoxy, tert-butoxy, pentoxy, 2-pentyl, isopentoxy, neopentoxy, hexoxy, 2-hexoxy, 3-hexoxy, and 3-methylpentoxy.

By the term "halogen" in the present invention is meant fluorine, bromine, chlorine, and iodine.

By aryl is meant an aromatic carbocyclic group having a single ring (e.g., phenyl), multiple rings (e.g., biphenyl), or multiple condensed rings in which at least one is aromatic, (e.g., 1,2,3,4-tetrahydronaphthyl, naphthyl, anthryl, or phenanthryl), which is optionally mono-, di-, or trisubstituted with, e.g., halogen, lower alkyl, lower alkoxy, lower alkylthio, trifluoromethyl, lower acyloxy, aryl, heteroaryl, and hydroxy. A preferred aryl is phenyl. A preferred phenyl group is unsubstituted or monosubstituted with lower alkoxy or halogen.

By solid support is meant a chemically inert, insoluble material, usually polymer, that carries functional groups on its surface that are used for the attachment of the linker, either directly or via a spacer molecule (e.g. polyethyleneglycol, or PEG). As an example, the solid support is a functionalized polystyrene resin that is cross-linked with 1–3% of divinyl benzene.

Representative compounds of general Formula I are shown below in Table 1.

TABLE 1

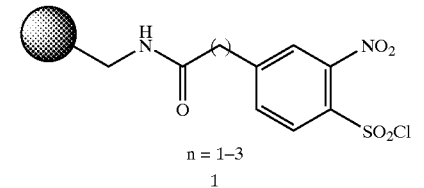

n = 1–3

1

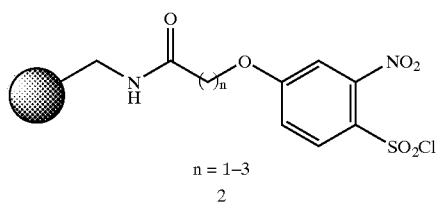

n = 1–3

2

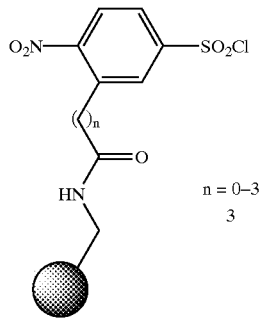

n = 0–3

3

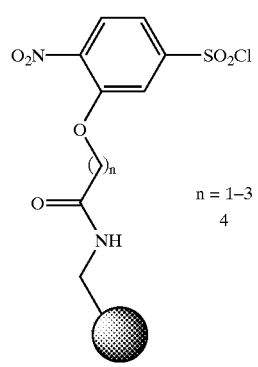

n = 1–3

4

TABLE 1-continued

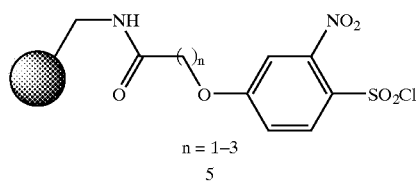

n = 1–3

5

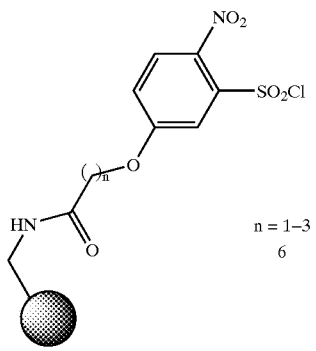

n = 1–3

6

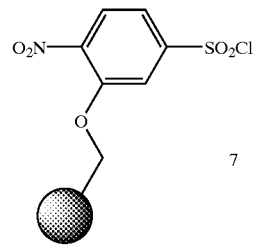

7

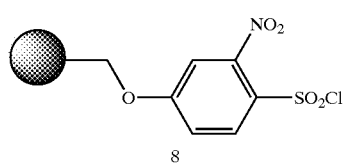

8

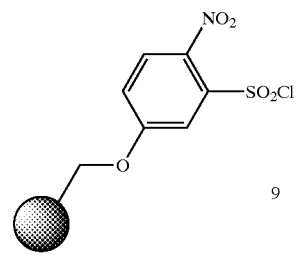

9

Representative compounds of the present invention, which are encompassed by Formula I, include, but are not limited to the compounds in Table I.

An illustration of the preparation of compounds of Formula I and Formula II is given in Schemes I and II, respectively. In Scheme II, the groups $R_1$ and $R_2$ are as defined in general Formula II.

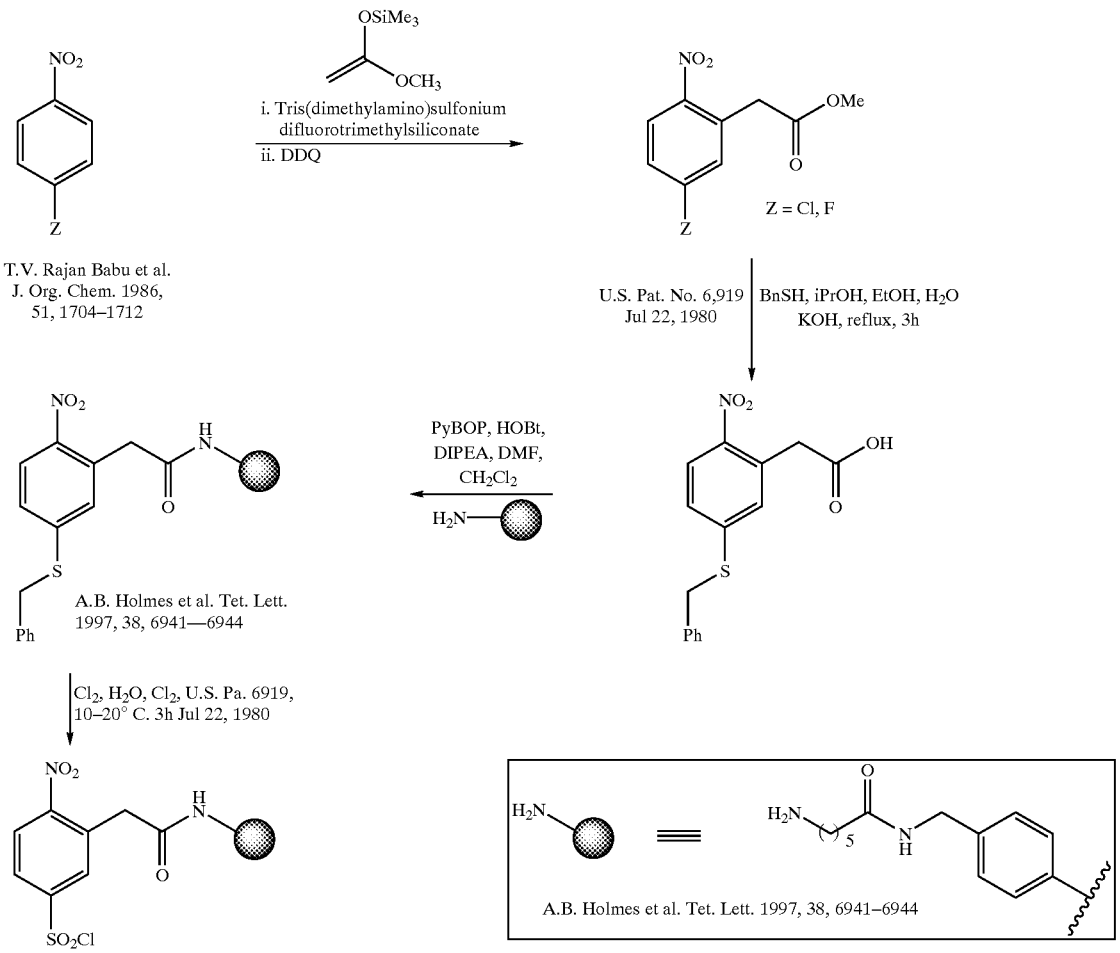
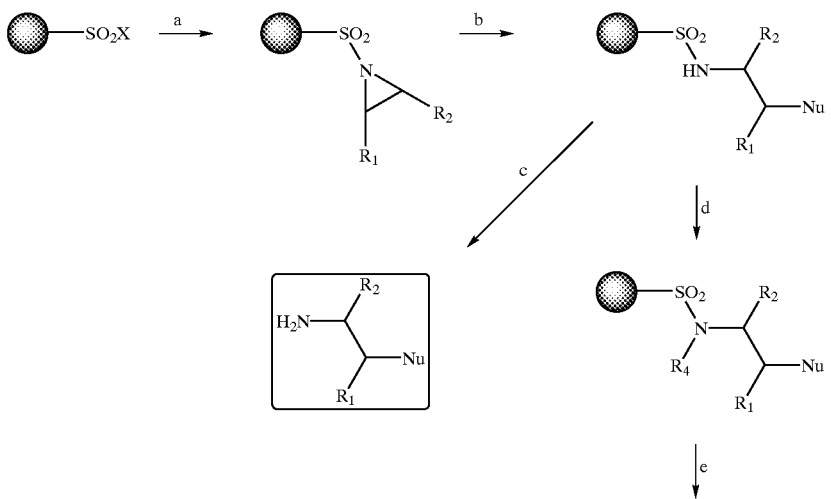

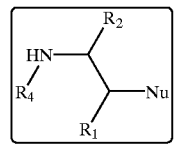

(a) aziridine, DMAP;
(b) Nu⁻;
(c) PhSH, DBU or PhSK, MeCN;
(d) NaHMDS, R₄–Y(Y = I, OMs, OTs, ONs);
(e) PhSH, DBU or PhSK, MeCN.

Those having skill in the art will recognize that the starting materials may be varied and additional steps employed to produce compounds encompassed by the present invention.

The disclosures in this application of all articles and references, including patents, are incorporated herein by reference.

The invention and manner and process of making and using it, are now described in such full, clear, concise and exact terms as to enable any person skilled in the art to which it pertains, to make and use the same. It is to be understood that the foregoing describes preferred embodiments of the present invention and that modifications may be made therein without departing from the spirit or scope of the present invention as set forth in the claims. To particularly point out and distinctly claim the subject matter regarded as invention, the following claims conclude this specification.

What is claimed is:

1. A compound of the formula

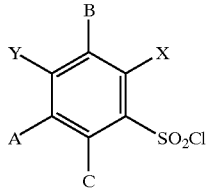

wherein

X and Y are different and represent hydrogen or $NO_2$; and

A, B and C are different and represent hydrogen or D where

D is

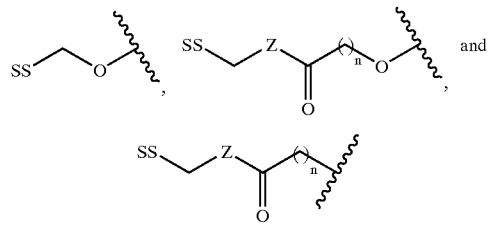

wherein

SS is a solid support;

Z is O, NH or NR where R is lower alkyl; and n is 0, 1, 2 or 3.

* * * * *